UNITED STATES PATENT OFFICE.

EDWARD S. MARSHALL AND ROBERT W. SAVAGE, OF TYLER, TEXAS.

PROCESS OF OBTAINING A LUBRICANT FROM THE CACTUS-PLANT.

SPECIFICATION forming part of Letters Patent No. 341,156, dated May 4, 1886.

Application filed January 2, 1886. Serial No. 187,455. (No specimens.)

*To all whom it may concern:*

Be it known that we, EDWARD S. MARSHALL and ROBERT W. SAVAGE, both citizens of the United States, residing at Tyler, in the county of Smith and State of Texas, have invented a certain new and useful Process of Obtaining from the Cactus-Plant a Certain New and Useful Product for use as a Lubricant; and we do hereby declare that the following is a full, clear, and exact description of said process and product, sufficient to enable others to understand said process, and to obtain said product and use the same.

The product obtained by our process consists, first, of a gelatinous material intermixed with a fibrous material and forming a homogeneous mass of fibrous and gelatinous material, suitable, without the addition of waste or other foreign material, for being used as a "dope" or "packing," so-called, in journals for railways and other like purposes; and, second, of a gelatinous material from said plant, free from all fibrous material, suitable for use in the ordinary manner in which lubricants have heretofore been applied.

The process by which we obtain the above-named products is—

First, the cactus-plant to be treated by our process is cut off closely to the ground, and the thorns are removed by the application of heat, thereby burning the same off the cactus. In case it is preferred in the removal of the thorns, the heat may be applied before cutting the stalk from the root.

Second. The stalk and branches are cut into slices or small sections and placed in a tub or vat; or the stalk and branches may be crushed by passing them through and between rollers in place of cutting them.

Third. The crushed or cut cacti are allowed to remain in said tubs or vats a sufficient time to reduce the contents, or allow the same to become reduced, to a gelatinous fibrous mass.

If it be necessary, the third and last-named step in our process may be omitted therefrom and the product already obtained at once used for the purpose of a dope or packing; but unless the product obtained by said first two-named steps of our process be required for immediate use we prefer to include in our process all of said steps, as hereinbefore described.

In practice we have found that in order to reduce the mass in said vats or tubs into the desired fibrous gelatinous condition preferred by us, when the same is to be used as a dope or packing, a period of from five to ten days is required, varying with the temperature of the room or place where said tubs or vats are placed, the lower the said temperature the longer the time required.

To produce the gelatinous product obtained by us free from the fibrous material hereinabove named as obtained by the first "three steps," so-called, of our process, a fourth and other step is necessary, consisting in the subjecting of the fibrous and gelatinous mass to severe pressure, either by rollers held together in a sufficiently-rigid manner or by direct pressure, as in a press, whereby the gelatinous product is pressed from the fibrous matter and separated therefrom.

The gelatinous product, as well as the mixture of gelatinous and fibrous product, obtained by our above-described process, is suitable for use as a lubricant, as aforesaid, and will so remain fit for use for a long time thereafter without other or further treatment or process, and without the addition of animal or vegetable oils or other foreign substance, the mass of combined gelatinous and fibrous material being, as we have found, admirably adapted for use as a packing or dope in railway and the like packing boxes or journals, no other or further refining being necessary in said products, or either of them.

Having thus described our invention, what we claim, and desire to secure by Letters Patent, is—

1. The process of preparing a lubricant from the cactus-plant, consisting of the following steps: first, removing from said plant the thorns thereon; and, second, of reducing said plant by cutting or crushing into small sections or pieces, substantially as described.

2. The process of obtaining a lubricant from the cactus-plant, consisting of the following steps: first, removing from said plant the thorns thereon; second, reducing said plant by cutting or crushing into small sections or pieces; and, third, of placing the same in tubs or vats and allowing it to remain there until it becomes a homogeneous fibrous and gelatinous mass, substantially as described.

3. The process of obtaining a lubricant from the cactus-plant, consisting of the following steps: first, removing from said plant the thorns thereon; second, reducing said plant by cutting or crushing into small sections or pieces; third, placing the product thus obtained into tubs or vats and allowing it to remain therein until it has become a homogenous mass of fibrous and gelatinous material; and, fourth, of separating said gelatinous portion from said fibrous portion by pressure, substantially as described, and for the purpose set forth.

4. As a new article of manufacture, a homogeneous mass of fibrous and gelatinous material obtained from the cactus-plant, and composed of the fiber of said plant and the contents of the cells therein, and suitable for use as a lubricant, substantially as described.

5. As a new article of manufacture, a homogeneous mass of fibrous and gelatinous material obtained from the cactus-plant, in the manner and by the process herein described, suitable for use as a lubricant, substantially as described.

6. As a new article of manufacture, a gelatinous material or product obtained from the cactus-plant, suitable for use as a lubricant, substantially as described.

EDWARD S. MARSHALL.
ROBERT W. SAVAGE.

In presence of—
J. T. BOWEN,
C. G. WHITE.